US011656342B2

United States Patent
Kulesh et al.

(10) Patent No.: US 11,656,342 B2
(45) Date of Patent: May 23, 2023

(54) HISTOGRAM-BASED SIGNAL DETECTION WITH SUB-REGIONS CORRESPONDING TO ADAPTIVE BIN WIDTHS

(71) Applicant: NXP B.V., Eindhoven (NL)

(72) Inventors: Maxim Kulesh, Hamburg (DE); Mark Steigemann, Ebstofr (DE)

(73) Assignee: NXP B.V., Eindhoven (NL)

( * ) Notice: Subject to any disclaimer, the term of this patent is extended or adjusted under 35 U.S.C. 154(b) by 1159 days.

(21) Appl. No.: 16/253,083

(22) Filed: Jan. 21, 2019

(65) Prior Publication Data
US 2020/0233066 A1    Jul. 23, 2020

(51) Int. Cl.
| | |
|---|---|
| *G01S 7/486* | (2020.01) |
| *G01S 17/10* | (2020.01) |
| *G01S 17/02* | (2020.01) |
| *G01S 7/4863* | (2020.01) |
| *G01S 17/04* | (2020.01) |

(52) U.S. Cl.
CPC ............ *G01S 7/4863* (2013.01); *G01S 17/04* (2020.01); *G01S 17/10* (2013.01)

(58) Field of Classification Search
CPC ........ G01S 7/4863; G01S 17/04; G01S 17/10; G01S 17/18; G01S 17/931; G01S 7/487; G01S 17/08; G01S 7/4865; G01S 17/026
USPC ....................................................... 356/5.01
See application file for complete search history.

(56) References Cited

U.S. PATENT DOCUMENTS

| | | |
|---|---|---|
| 9,502,458 B2 | 11/2016 | Parmesan |
| 2016/0131744 A1 | 5/2016 | Addison et al. |
| 2017/0052065 A1 | 2/2017 | Sharma et al. |
| 2019/0383913 A1 | 12/2019 | Crouch et al. |

FOREIGN PATENT DOCUMENTS

WO    WO-2018125438 A2 *    7/2018    ........... G01S 17/107

OTHER PUBLICATIONS

Dutton, Neale AW, et al. "11.5 A time-correlated single-photon-counting sensor with 14GS/S histogramming time-to-digital converter." Solid-State Circuits Conference—(ISSCC), 2015 IEEE International. IEEE, 2015.

* cited by examiner

*Primary Examiner* — Daniel L Murphy

(57) ABSTRACT

Various example embodiments are directed to apparatuses and methods including an apparatus having sensor circuitry and processing circuitry. In one example, sensor circuitry produces and senses detected signals corresponding to physical objects located in an operational region relative to a location of the sensor circuitry. The processing circuitry records and organizes information associated with the detected signals in a plurality of sub-histograms respectively associated with different accuracy metrics for corresponding sub-regions of the operational region, each of the plurality of sub-histograms including a set of histogram bins characterized by a bin width linked to its accuracy metric, and refines at least one of the accuracy metric by adapting one or more of the bin widths dynamically in response to the detected signals.

20 Claims, 13 Drawing Sheets

HISTOGRAM-BASED SIGNAL DETECTION WITH SUB-REGIONS CORRESPONDING TO ADAPTIVE BIN WIDTHS

OVERVIEW

Aspects of various embodiments are directed to histogram-based signal detection with sub-regions corresponding to adaptive bin widths.

For a number of applications, it can be beneficial to detect photon reception and generate data concerning photon arrival time within a given timing window, such as for time-of-flight applications. For example, sensor systems that utilize Light Detection and Ranging (LIDAR) are increasingly being deployed in vehicles to implement, for example, safety and/or autonomous driving features. A typical LIDAR system includes an illuminator (e.g., a light source) and a detector. The illuminator can be, for example, a laser that emits light having a particular operating wavelength. The illuminator emits light toward a target, which then scatters the light. Some of the scattered light is received back at the detector. The system determines the distance to the target based on one or more characteristics associated with the returned light. For example, the system may determine the distance to the target based on the time-of-flight of a returned light pulse.

LIDAR plays an important role in autonomous vehicles due to its high range and angular resolutions. Single-Photon Avalanche Photodiode (SPAD), also sometimes referred to as Geiger-Mode Avalanche Photodiode, is one of the promising receiver technologies for automotive LIDAR thanks to its unique properties including a high sensitivity down to a single photon, a high time resolution, and a low cost and high array resolution enabled by planar device structures (e.g., CMOS SPAD). By biasing a device above a breakdown voltage, even a single released charge carrier (e.g., an electron or "hole") can result in a self-sustained avalanche. A release of charge carrier can be due to the absorption of the incident photon (e.g., signal or noise), can be thermally induced release (known as a "dark count"), or the release of trapped charge carriers from a previous avalanche (known as "afterpulses"). Note that avalanche triggers can be considered herein as an event. Upon an event, the SPAD device can be quenched-off (e.g., the bias voltage can be lowered below the breakdown voltage into a linear operation mode), to avoid permanent damage of the device.

SPAD has a proven record of time-of-flight in time correlated single photon counting (TCSPC) configurations for short range and low noise environment applications, such as fluorescence lifetime microscopy. In such a configuration, a SPAD array may include a timing circuit composed of, for example, a Time-to-Digital Converter (TDC), or a Time-to-Analog Converter (TAC) followed by an Analog-to-Digital Converter (ADC), which together measure the time between the reference signal (e.g. laser light pulse) and the SPAD output signal caused by an avalanche. The corresponding time-of-flight record can be stored, for example, in a register or a latch for subsequent read-out. In such configurations, the earlier photons "block" the following photons, and the probability that the time-of-flight is not yet recorded and that the SPAD is active can drop exponentially with the time.

In order to mitigate the effect of single-photon operation mode (e.g., blocking of signal by prior noise, non-unity photon detection probability, etc.) a single acquisition cycle can be composed of multiple measurements and a signal can be identified via a statistical approach, such as, for example, by a construction of time-of-flight records histogram and further signal processing.

These and other matters have presented challenges to efficiencies of signal detection approaches for a variety of applications.

SUMMARY

Various example embodiments are directed to issues such as those addressed above and/or others which may become apparent from the following disclosure concerning recording and organizing information associated with detected signals in a plurality of sub-histograms having adaptive bin widths.

In certain example embodiments, aspects of the present disclosure involve simultaneously identifying a distance of two or more physical objects from sensor circuitry by producing and sensing detected signals corresponding to the physical objects located in an operational region and organizing information associated with the detected signals in a plurality of sub-histograms corresponding to sub-regions of the operational region and having adaptive bin widths.

In a more specific example embodiment, an apparatus includes sensor circuitry and processing circuitry. The sensor circuitry produces and senses detected signals corresponding to physical objects located in an operational region relative to a location of the sensor circuitry. The sensor circuitry can include single-photon avalanche photodiode (SPAD) array circuitry that senses optical signals and, in response, produces the detected signals. As further described herein, the sensor circuitry can measure a time-of-flight by sensing the (reflected) optical signals. The processing circuitry can record and organize information associated with the detected signals in a plurality of sub-histograms respectively associated with different accuracy metrics for corresponding sub-regions of the operational region and refine at least one of the accuracy metrics by adapting one or more of the bin widths dynamically in response to the detected signals. Each of the plurality of sub-histograms includes a set of histogram bins characterized by a bin width linked to its accuracy metric. In various specific embodiments, the plurality of sub-histograms with the adapted one or more bin widths can be used to simultaneously determine a distance of two or more physical objects from the sensor circuitry.

The accuracy metric can be indicative of a detection reliability and/or a level of resolution. For example, the plurality of sub-histograms correspond to different sub-regions of the operational region with each of the different sub-regions at least temporarily covering a different range indicated by a (possible) distance between the sensor circuitry and one or more of the physical objects. The plurality of sub-histograms can include at least two sub-histograms corresponding to two different sub-regions of the operational region and/or each of the two or more sub-histograms have a different bin width than the others, and wherein at least one of the different bin widths is adapted dynamically in response to the at least one portion of the detected signals, although embodiments are not so limited. In more specific embodiments, each of the plurality of histogram bins has a bin width that is less than half of a transmitted light pulse width.

The processing circuitry can refine the at least one accuracy metric as a function of at least one of an indication of power sensed in optically received signals, and an indication of distance between the sensor circuitry and one or more of the physical objects. As a specific example, the processing circuitry refines the at least one accuracy metric as a function of at least one of an indication of power or distance sensed in optically received signals by changing one of the bin widths of one of the plurality of different sub-histograms for a coarser detection to optimize or improve detection reliability of one or more distal ones of the physical objects, and by changing another one of the bin widths of another of the plurality of sub-histograms for a finer detection to optimize or improve resolution in terms of detecting one or more proximal ones of the physical objects. In accordance with various embodiments, the bin widths inside a single sub-histogram are equal (e.g., the same) for all bins of the respective sub-histogram, and the bin widths of different sub-histograms are independent and, in a number of embodiments, distinct. The bin width for a single-histogram can be changed and/or adjusted over time, such as from frame to frame. As another specific example, the processing circuitry refines the accuracy metric in response to the detected signals indicating presence of a proximate one of the physical objects and of a distal one of the physical objects by adjusting a first bin width for a first one of the plurality of sub-histograms for optimizing or improving resolution associated with the proximate one of the physical objects, and adjusting a second bin width corresponding to a second one of the plurality of sub-histograms for optimizing or improving detection reliability associated with the distal one of the physical objects.

In a number of specific embodiments, the processing circuitry provides indications of power for the detected signals in each of the plurality of histogram bins, and refines the accuracy metric by adjusting the bin widths based on empirical data indicating correspondence between bin widths and detected-signal power. The processing circuitry can facilitate detection reliability according to signal-to-noise ratio (SNR) of the detected signals, in order to process peak detection of the detected signals, wherein at least one of the bin widths is adjusted as an iterative step to improve the peak detection. Further, the processing circuitry can generate, at least temporarily, the plurality of sub-histograms (e.g., the sets of histogram bins) as a function of empirical data indicating correspondence between bin widths and detected-signal power, the empirical data being provided from a storage circuit integrated with the processing circuitry and/or being received from a communication channel provided from an external circuitry.

In various embodiments, the sensor circuitry and the processing circuitry operate concurrently, and in real-time, with the sensor circuitry producing the detected signals while the processing circuitry is constructing information for the plurality of sub-histograms. For example, the sensor circuitry can operate in an autonomous, or semi-autonomous, driving (or flying) mode with the detected signals being produced dynamically and with the bins of the plurality of sub-histograms having information changing dynamically. In specific embodiments, the apparatus further includes an automobile to which the sensor circuitry and the processing circuitry are secured, and wherein during movement of the automobile, the sensor circuitry produces the detected signals dynamically and in response the processing circuitry refines the accuracy metric for at least one of the plurality of sub-histograms dynamically by adapting its bin width. Although embodiments are not limited to automotive applications and can involve drones, robotic applications and the like.

Other specific embodiments are directed to methods of using the above-described apparatus, such as a method for sensing physical objects located in an operational region. The method includes using sensor circuitry to sense and produce detected signals corresponding to physical objects located in the operational region relative to a location of the sensor circuitry. The method further includes using processing circuitry operating in response to the detected signals to record and organize information associated with the detected signals in a plurality of sub-histograms respectively associated with different accuracy metrics for corresponding sub-regions of the operational region, each of the plurality of sub-histograms including a set of histogram bins characterized by a bin width linked to its accuracy metric, and refine the at least one of the accuracy metrics by adapting one or more of the bin widths dynamically in response to the detected signals. Adapting one or more of the bin widths can include dynamically adapting the bin width of at least one sub-histogram in response to detected signals in one or more of the bins. Further, in specific embodiments, the information is organized in two or more sub-histograms, wherein at least one of the two or more sub-histograms have a different bin width than the other of the two or more sub-histograms.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
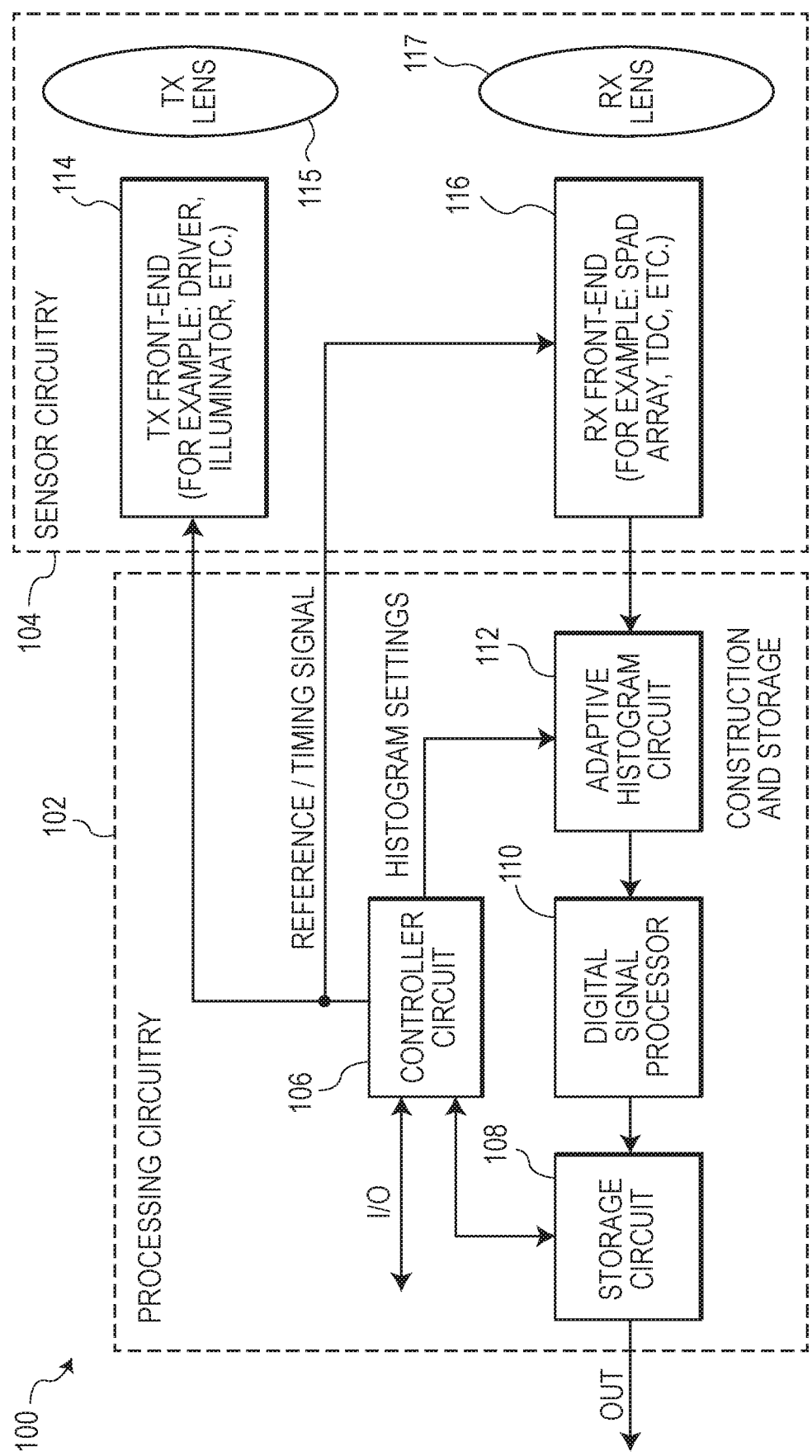
FIG. 1 illustrates an example of an apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving histogram-based signal detection with sub-regions corresponding to adaptive bin widths. In certain embodiments, aspects of the present disclosure have been shown to be beneficial when used in the context of recording and organizing information associated with detected signals in systems involving light detection and ranging (LIDAR) and in which a plurality of sub-histograms associated with or corresponding to sub-regions of an operational region. In some embodiments, the adaptive histograms are used with adaptive bin widths to simultaneously detect a distance of two or more physical objects from the sensor circuitry. While not necessarily so limited, various aspects may be appreciated through the following discussion of non-limiting examples which use exemplary contexts.

In the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Some of the specific examples discussed below are directed to and/or include features involving detection of light detection and ranging (LIDAR), such as autonomous driving for automobiles or flying drones. Single-Photon Avalanche Photodiode (SPAD), an avalanche diode operating in a single-photon (or Geiger mode), is a receiver technology that can be used for a LIDAR system due to associated properties including high sensitivity down to a single photon, high time resolution and high array resolution enabled by planar device structure, such as complementary metal-oxide-semiconductor (CMOS) SPAD which manifests adequate time-of-flight in time correlated single photon counting configurations. By biasing a device above a breakdown voltage, even a single released charge carrier (e.g., an electron or "hole") can result in a self-sustained avalanche. A release of charge carrier can be due to the absorption of the photon (e.g., signal or noise), can be thermally induced release (known as a "dark count"), or the release of trapped charge carriers from a previous avalanche (known as "after-pulses"). Note that avalanche triggers can be considered herein as an event. Upon the event (e.g. detection of reflected signal) the diode is quenched off (bias voltage lowered below breakdown) into linear mode to avoid permanent damage, and the diode consequently is held in a linear mode for a certain period of time to substantially reduce the probability of after-pulsing. This time period is often referred to as a dead-time, during which no signal can be detected. SPAD pixels can be followed by an array of time-to-digital converters for time-of-flight estimation. To mitigate the effects of single-photon operation mode (e.g., blocking of signal by prior noise, non-unity photon detection probability, etc.), time-of-flight measurements are repeated multiple times and the true signal is statistically identified via construction of single-photon detection histograms.

Due to the effects of the single-photon operation mode, a strong signal may be represented by a narrow full-width at half maximum (FWHM), while a weak signal may be represented by a wider FWHM given a longer integration time for SPAD saturation. As the shape of the detected signal in the histogram may not represent the real shape of incoming optical signals, a balance and/or trade-off can occur between higher resolution for strong signals (e.g., high reflectivity and/or short range) and higher detection reliability for weak signals (e.g. low reflectivity and/or long range) when bin width for the histogram is considered. Various embodiments are directed to a technique to overcome this trade-off using an efficient/fast and inexpensive circuitry as dictated by real-time automotive applications (among others, such as flying drones) and cost-sensitivity of the industry by incorporating power-adaptive binning for LIDAR systems based on SPAD. A principle of the power-adaptive histogram binning technique is a sub-division of the sensor circuitry's complete operational region, which can also be referred to as the "operation range" of the sensor circuitry, into sub-regions each with its independent sub-histogram each with respective bin width. The bin widths are adapted to signal power both spatially and temporally in dynamic environment to improve or optimize an accuracy metric associated with one or more sub-histograms. All sub-histograms are used in a combined manner to mimic a single frequency-based histogram over the complete operational region. The technique overcomes resolution—detection reliability trade-off between strong and weak signals resulting from SPAD's probabilistic nature and inherent dead-time.

A number of embodiments are directed to range-adaptive histogram binning for LIDAR systems using SPAD array circuitry in addition to the above-described power-adaptive histogram binning technique. In long range applications, such as automotive, range inverse square power drop dominates the dynamic range. For example, differences between reflections from an object at 1 meter (m) away to one from an object of 100 m away is 10000 fold. In this context, various embodiments are directed to a range-adaptive application of a power-adaptive histogram binning technique that compensates for the range inverse square power drop. Efficient circuitry, according to the instant disclosure, preserves low computational costs of equi-width histogram for enabling real-time histogram construction parallel to data acquisition. The circuitry determines how the complete operational region is sub-divided and bin widths are assigned.

More specific embodiments are directed to an apparatus that includes sensor circuitry and processing circuitry, wherein the sensor circuitry produces and senses detected signals corresponding to physical objects located in an operational region relative to a location of the sensor circuitry. In more specific embodiments, the sensor circuitry includes SPAR array circuitry that senses optical signals and, in response, produces the detected signals. For example, the sensor circuitry can be configured to measure a time-of-flight by sensing the (reflected or returned) optical signals. The processing circuitry records and organizes information associated with the detected signals in a plurality of sub-histograms respectively associated with different accuracy metrics for corresponding sub-regions of the operational region and refines at least one of the accuracy metrics by adapting one or more of the bin widths dynamically in response to the detected signals. Each of the plurality of sub-histograms includes a set of histogram bins characterized by a bin width linked to its accuracy metric. In various specific embodiments, the plurality of sub-histograms with the adapted one or more of the bin widths can be used to simultaneously determine a distance of two or more physical objects from the sensor circuitry.

The accuracy metric is indicative of a detection reliability and/or a level of resolution. For example, the bin widths can be adjusted to improve or optimize detection reliability and/or a level 3 of resolution for one or more of the sub-histograms. In specific embodiments, the plurality of sub-histograms correspond to different sub-regions of the operational region with each of the different sub-regions at least temporarily covering a different range indicated by a possible distance between the sensor circuitry and one or more of the physical objects. The plurality of sub-histograms include at least two sub-histograms corresponding to two different sub-regions of the operational region and/or each of the two or more sub-histograms have a different bin width than the others, and wherein at least one of the different bin widths is adapted dynamically in response to the at least portion of the detected signals, although embodiments are not so limited. In more specific embodiments, each of the plurality of histogram bins has a bin width that is less than half of a transmitted light pulse width.

The processing circuitry can refine the at least one accuracy metric as a function of at least one of an indication of power sensed in optically received signals, and an indication of distance between the sensor circuitry and one or more of the physical objects. As a specific example, the processing circuitry refines the at least one accuracy metric as a function of at least one of an indication of power or distance sensed in optically received signals by changing one or more of the bin widths of the plurality of different sub-histograms for a coarser detection to optimize or improve detection reliability of one or more distal ones of the physical objects, and by changing another one of the bin widths of another of the plurality of sub-histograms for a finer detection to optimize or improve resolution in terms of detecting one or more proximal ones of the physical objects. In various embodiments, changing one (or more) of the bin widths of the plurality of different sub-histograms includes changing the bin width of each of the bins of the respective sub-histogram to the same (changed or revised) bin width. For example, assume a histogram has four sub-histograms and each sub-histogram contains ten bins. The bin width of each (e.g., all) of the ten bins of a respective sub-histogram is changed to the same revised bin width.

In a number of specific embodiments, the processing circuitry provides indications of power for the detected signals in each of the plurality of histogram bins, and refines at least one of the accuracy metrics by adjusting the bin widths based on empirical data indicating correspondence between bin widths and detected-signal power. The processing circuitry can facilitate detection reliability according to signal-to-noise ratio (SNR) of the detected signals, in order to process peak detection of the detected signals. The at least one of the bin widths can be adjusted as an iterative step to improve the peak detection. Further, the processing circuitry can generate, at least temporarily, the plurality of sub-histograms as a function of empirical data indicating correspondence between bin widths and detected-signal power. The empirical data can be provided from a storage circuit integrated with the processing circuitry and/or received from a communication channel provided from an external circuitry.

In various embodiments, the sensor circuitry and the processing circuitry operate concurrently in real-time, with the sensor circuitry producing the detected signals while the processing circuitry is constructing information for the plurality of sub-histograms. For example, the sensor circuitry can operate in an autonomous, or semi-autonomous, driving mode with the detected signals being produced dynamically and with the bins of the plurality of sub-histograms having information changing dynamically. In specific embodiments, the apparatus further includes an automobile to which the sensor circuitry and the processing circuitry are secured, and wherein during movement of the automobile, the sensor circuitry produces the detected signals dynamically and in response the processing circuitry refines the accuracy metric for at least one of the plurality of sub-histograms dynamically by adapting its bin width. Although embodiments are not limited to automotive applications and can include drones, robotic, etc.

Other specific embodiments are directed towards methods of using the above-described apparatus, such as a method for sensing physical objects located in an operational region, as further described herein.

Turning now to the figures, FIG. 1 illustrates an example of an apparatus, in accordance with the present disclosure. The apparatus 100 includes sensor circuitry 104 and processing circuitry 102.

The sensor circuitry 104, as one example of the present disclosure, can produce and sense detected signals corresponding to physical objects located in an operational region relative to a location of the sensor circuitry 104. In specific embodiments, the sensor circuitry 104 can include SPAD array circuitry that senses optical signals and, in response, produces detected signals. The SPAD array circuitry can include an array of SPADs. For example, the sensor circuitry 104 can transmit a signal that can be reflected from physical objects within the operational region of the transmitted signals using transmitter circuitry (e.g., transmitter (TX) front-end circuitry 114). Signals reflect from the target objects and the reflected signals are detected via receiver circuitry (e.g., receiver (RX) front-end circuitry 116) of the sensor circuitry 104. The produced signals and received reflected signals are used to determine a time-of-flight of the signal as transmitted and reflected.

As may be appreciated, SPADs, (including Geiger-mode avalanche photodiodes), are detectors capable of capturing individual photons with very high time-of-arrival resolution, of the order of a few tens of picoseconds. SPADs can be fabricated in dedicated semiconductor processes or in standard CMOS technologies, using known arrays of SPAD sensors, such as used in three-dimensional (3D) imaging cameras.

In specific embodiments, the sensor circuitry 104 includes a TX front-end circuitry 114 and RX front-end circuitry 116. As further described herein, the TX front-end circuitry 114 and RX front-end circuitry 116 are used to send reference signals and detect (reflected) signals therefrom (e.g., via the TX lens 115 and RX lens 117), which correspond to physical objects and which are used to estimate a time-of-flight for the reference signal and reflected signals that are indicative of a distance of the physical object from the sensor circuitry 104.

The apparatus further includes processing circuitry 102 that is in communication with the sensor circuitry 104. The processing circuitry 102 is used to generate an adaptive histogram using the detected signals and uses the adaptive histogram to determine or estimate a distance of physical objects from the sensor circuitry 104. The processing circuitry 102 can include an array of processing circuits coupled to the SPAD array circuitry. An adaptive histogram includes or refers to a histogram having a plurality of sub-histograms, with each sub-histogram having adaptive bin widths and the combination of the plurality of sub-histograms capturing the operation region. As further described herein, the bin widths can be adaptive to refine one or more accuracy metrics as a function of an indication of power sensed in received signals and/or an indication of a range or distance between the sensor circuitry 104 and one or more of the physical objects. For example, the processing circuitry 102 records and organizes information associated with the detected signals in the plurality of sub-histograms respectively associated with different accuracy metrics for corresponding sub-regions of the operational region, each of the plurality of sub-histograms including a set of histogram bins characterized by a bin width linked to its accuracy metric. The processing circuitry 102 further refines at least one of accuracy metrics by adapting one or more of the bin widths dynamically in response to the detected signals.

The specific embodiment illustrated by FIG. 1 illustrates a processing circuitry 102, for example, as a part of an automotive LIDAR system. In such embodiments, the processing circuitry 102 includes a controller circuit 106, adaptive histogram circuit 112, a digital signal processor 110, and a storage circuit (e.g., random access memory (RAM)) 108. The controller circuit 106 synchronizes and orchestrates the complete system. The controller circuit 106 sends reference or timing signals to the TX and RX front-end circuitries 114, 116 to synchronize time origins for time-of-flight estimation. The controller circuit 106 can also control histogram parameters and/or settings, e.g., bin width settings for sub-histograms. The TX and RX front-end circuitries 114, 116 can include a variety of known front-end signal-receiving circuitry and related logic for processing of I/O signals related to the controller circuit 106. The output of RX front-end circuitry 116 is a time-of-flight record of a single detection in digital format (hereinafter time or data record). Upon detection of the signal, the histogram is updated with the new data record. The adaptive histogram circuit 112 can be used to generate and store the adaptive histogram having sub-histograms with adaptive bin widths.

In various embodiments, the apparatus 100 further includes an automobile to which the sensor circuitry 104 and the processing circuitry 102 are secured. During movement of the automobile, the sensor circuitry 104 produces the detected signals dynamically and, in response, the processing circuitry 102 refines the accuracy metric for at least one of the plurality of sub-histograms dynamically by adapting its bin width. As may be appreciated, embodiments are not so limited to automotive applications.

Such an accuracy metric, in accordance with a number of embodiments, can be indicative of a detection reliability and/or a level of resolution. For example, the sensor circuitry 104 can measure a time-of-flight by sensing optical signals and the processing circuitry 102 determines a distance of two or more physical objects from the sensor circuitry 104 using the plurality of sub-histograms with the adapted one or more of the bin widths. In specific embodiments, the plurality of sub-histograms includes at least two sub-histograms corresponding to two different sub-regions of the operational region. Each of the two or more sub-histograms can have a different bin width than the others, and at least one of the different bin widths is adapted dynamically in response to the at least portion of the detected signals. In various specific embodiments, each of the plurality of histogram bins has a bin width that is less than half of a transmitted light pulse width.

In accordance with various embodiments, the bin widths are adjusted based on the power of the detected signals. As described above, the bin widths can be adapted to refine an accuracy measurement of the histogram. The accuracy metric can be indicative of the detection reliability and/or level of resolution of a sub-histogram. Such an adaptive bin width technique can include a variable, relative to the range, bin width used to optimize resolution and detection reliability. By adapting the bin widths based on the power of the signals detected, weak signals can have a higher detection reliability while strong signals can have a higher resolution for the complete operation region of the histogram. For example, narrow bins are associated with strong signals, e.g., close targets and/or high reflectivity, to reach higher resolution, and wider bins are associated with weak signals, e.g., distant targets and/or low reflectivity, to ensure higher detection reliability. Bin width(s) can also change temporally, e.g., with acquisition cycles, adapting to a dynamic environment.

Figure 5:
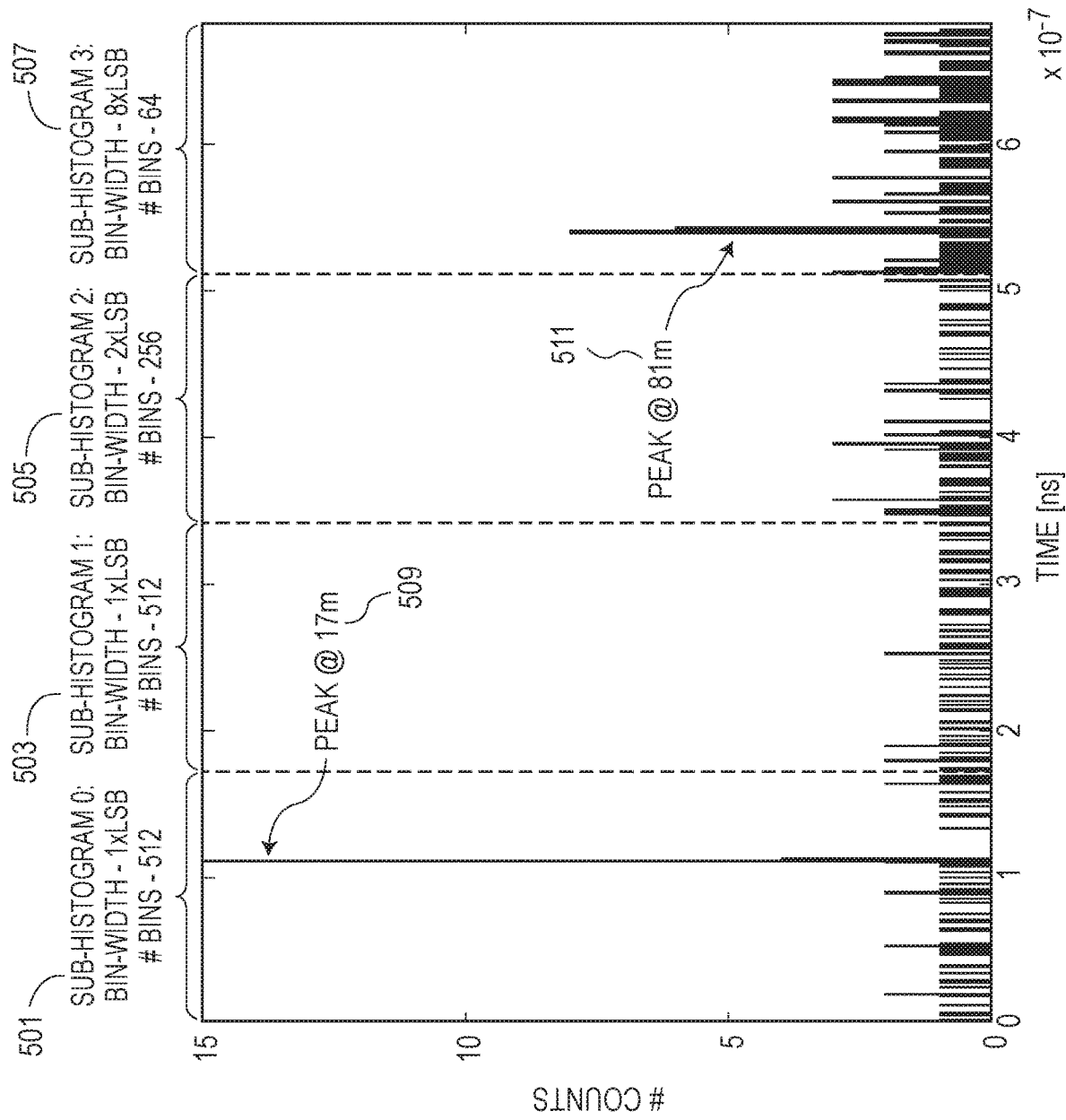
FIG. 5 illustrates an example of a power-adaptive histogram, in accordance with various embodiments.

As further illustrated herein, such as by FIG. 5, the processing circuitry 102 (via the adaptive histogram circuit 112) can divide the complete operational region into sub-regions each with its corresponding sub-histogram. Each sub-region can be adapted to a signal power by varying respective bin widths independently of other sub-regions. For example, an operational region is subdivided into four sub-regions each with its corresponding sub-histogram with bin widths of 1, 1, 2, 8 x least significant bit (LSB) (x-times) respectively, where LSB is the least significant bit of time-of-flight record. Each sub-histogram can be thought of as an independent equi-width histogram, with its ease of maintenance and capability of updating in real-time without partial or complete reconstruction. However, all sub-histograms combined mimic the effect of frequency-based histograms, such as equi-depth, as the bin-widths for each sub-histogram are adjusted to signal power and/or can be changed temporally, with acquisition cycles. The plurality of sub-histograms correspond to the different sub-regions of the operational region with each of the different sub-regions at least temporarily covering a different range indicated by a (possible) distance between the sensor circuitry 104 and one or more of the physical objects.

More specifically, the processing circuitry 102 can refine the one or more accuracy metrics as a function of at least one of the indication of power or distance sensed in optically received signals by changing one of the bin widths of one of the plurality of different sub-histograms for a coarser detection to optimize or improve detection reliability of one or more distal ones of the physical objects, and by changing another one of the bin widths of another of the plurality of sub-histograms for a finer detection to optimize or improve resolution in terms of detecting one or more proximal ones of the physical objects. The processing circuitry 102 can facilitate detection reliability according to SNR of the produced signals, in order to process peak detection of the produced signals.

In other related embodiments, such accuracy metrics can additionally and/or alternatively be refined based on a range or distance between the sensor circuitry 104 and the one or more physical objects (e.g., a sub-region of the operational region). The processing circuitry 102 can refine the accuracy metric as a function of at least one of an indication of power sensed in optically received signals, and an indication of distance between the sensor circuitry and one or more of the physical objects.

The processing circuitry 102 can generate, at least temporarily, the plurality of sub-histograms as a function of empirical data indicating correspondence between bin widths and detected-signal power. The empirical data can be provided from a storage circuit 108 integrated with the processing circuitry 102. In other embodiments and/or in addition, the empirical data can be received from a communications channel provided from an external circuit. For example, the empirical data can be from an external system (e.g., external navigation system) or from another circuit associated with the apparatus 100, such as an internal navigation system of an automobile that has a pre-programmed table based on analytics (e.g., analytics of the driver's habits and/or environment).

The sensor circuitry 104 and the processing circuitry 102 can operate concurrently in real-time. For example, the sensor circuitry 104 produces the detected signals while the processing circuitry is constructing information for the plurality of sub-histograms. In a specific embodiment, the sensor circuitry 104 operates in an autonomous, or semi-autonomous, driving mode with the detected signals being produced dynamically and with the bins of the plurality of sub-histograms having information changing dynamically.

Figure 2:
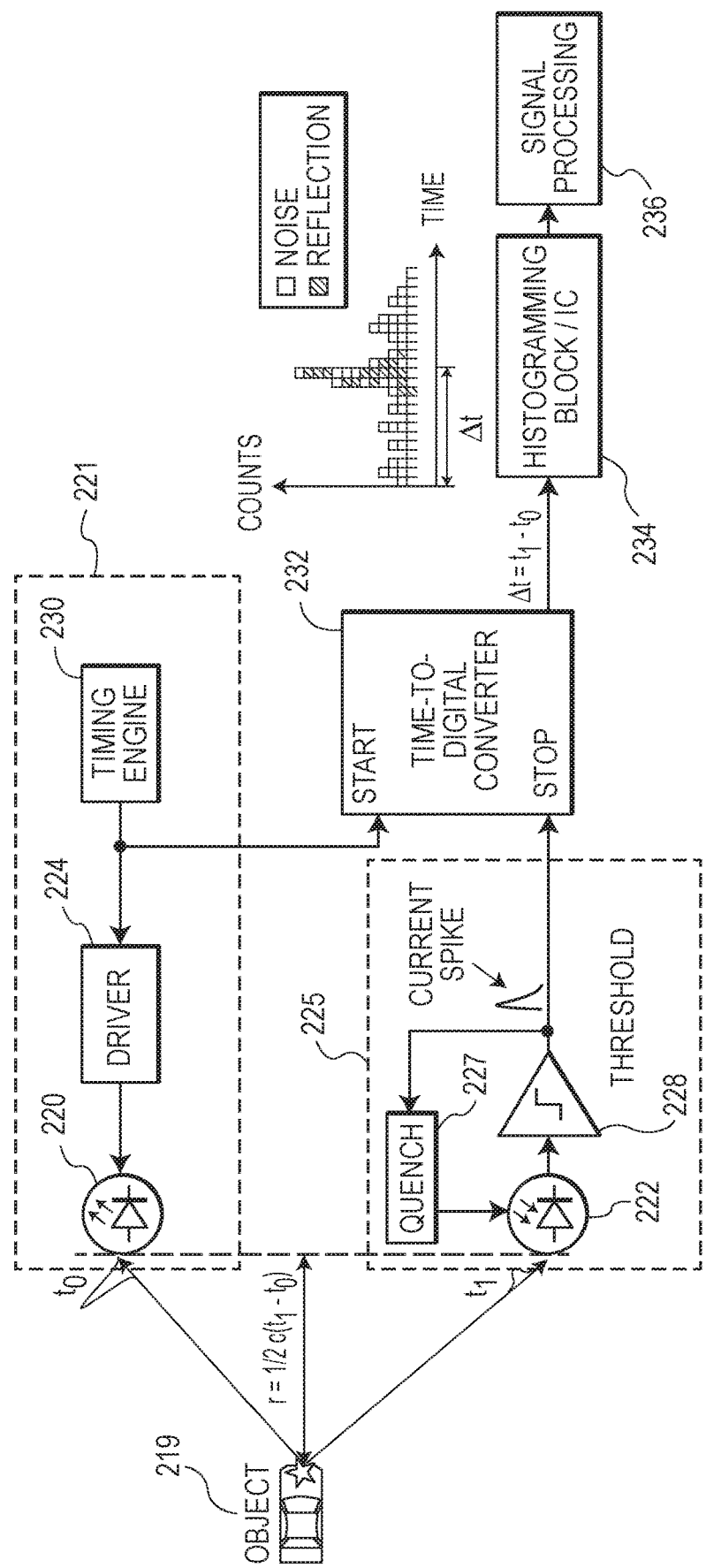
FIG. 2 illustrates an example of operation of an apparatus, such as an apparatus of the type as consistent with FIG. 1, in accordance with the present disclosure.

FIG. 2 illustrates an example of operation of an apparatus, such as an apparatus of the type as in connection with FIG. 1, in accordance with the present disclosure. The specific embodiment illustrated by FIG. 2 can include the apparatus 100 illustrated by FIG. 1 as used in an automotive, robotic, drone or other applications concerning detection of physical objects. As previously described, the physical objects can be detected using a time-of-flight technique by transmitting signals via a TX front-end circuit and receiving reflected signals in response thereto via a RX back-end circuit. The range (e.g., distance) r is calculated based on the time-of-flight (t1−t0). The time stamping can be via am edge or peak, respectively using thresholding and time-to-digital converter (TDC) or an analog-to-digital converter (ADC) and processing (e.g., with the TDC and ADC being high speed circuits).

FIG. 2 illustrates another example specific circuit-based approach, also in accordance with the present disclosure of operation, which is consistent with aspects discussed above in connection with FIG. 1. As illustrated, the approach shown in FIG. 2 involves an automobile 219 and its circuitry including optical-signal generation circuitry 221 and optical-signal processing circuitry 225, which form sensor circuitry such as the sensor circuitry 104 illustrated by FIG. 1. The optical-signal generation circuitry 221 generates optical radiation, which when reflected off of physical objects (e.g., trees, buildings, automobiles), is detected by the optical-signal processing circuitry 225. Additional circuitry is configured to process signals output from the optical-signal generation circuitry 221 and the optical-signal processing circuitry 225. In various embodiments, the sensor circuitry illustrated by FIGS. 1 and 2 (as well as further illustrated by FIG. 8A) form a LiDAR system.

The optical-signal generation circuitry 221 includes a transmitter driver 224, a timing engine 230, and a transmitter illuminator 220 that form a transmitter path (also referred to as a transmit path). Emission of optical radiation by the transmitter illuminator 220 is controlled by the transmitter driver 224 and timing engine 230. The transmitter illuminator 220 constitutes an illuminator (e.g., a laser or otherwise). Example illuminators include a light emitting diode, an edge-emitting laser, a vertical cavity surface emitting laser, and a known array thereof. Optical radiation emitted by the transmitter illuminator 220 travels until it is reflected by physical objects (e.g., trees, buildings, other automotive vehicles). The reflected optical radiation is sensed/received by optical-signal processing circuitry 225, at which point time-of-flight of the emitted optical radiation is determined.

The optical-signal processing circuitry 225 includes a single-photon avalanche diode (SPAD) array 222 and a threshold (level-detection) circuit 228 (as well as a quenching circuit 227). The SPAD array 222 is configured to detect the reflected optical radiation. Once detected by SPAD array 222, the optical radiation is thresholded (e.g., compared to a quiescent point by threshold circuit 228) before it is passed to additional circuitry for further processing. The sensor circuitry of the LIDAR system can further include a lens and a bandpass filter, which can be located in the LIDAR system with respect to the SPAD array 222.

Note that in some embodiments, the transmitter path may include a micro-electro-mechanical system (MEMS) scanner and a MEMS driver for two-dimensional (2D) steering of a laser beam or one-dimensional (1D) steering of an array of laser beams or line-laser. In other embodiments, the transmitter or transmitter path may include an optical phase array and drivers for scanning a laser beam.

In yet other embodiments, the transmitter or the transmitter path may include a VCSEL (vertical cavity surface emitting laser) array.

In still other embodiments, the transmitter or transmitter path may include a lens system for spreading the beam into a complete field-of-view (e.g. flash) or for laser beam collimation. It can be thus be appreciated that a number of different configurations can be implemented for the transmitter or transmitter path. The point is that the disclosed transmitter can be configured from a variety of different types of devices and elements.

The additional circuitry, which is configured to process the at least one signal output form the optical-signal generation circuitry 221 and the optical-signal processing circuitry 225 is comprised of a time-to-digital converter (TDC) 232, a histogramming circuitry (e.g., block/IC) 234, and signal processing circuitry 236. The TDC 232 is configured to receive the detected reflected optical radiation from the optical-signal processing circuitry 225 (which is indicative of time of incidence of a single photon) as detected by the constituent SPAD array 222. Time of incidence is used to increment a count in memory of the respective incidence photon of the optical-signal processing circuitry 225 via the histogramming circuitry 234 and for signal processing via the signal processing circuitry 236.

Upon the event (e.g., a detection of a reflected signal), the timing circuit (e.g., the TDC 232 illustrated in the embodiment of FIG. 2) outputs the time difference between the event and the reference/signal, referred to as measured time-of-flight record, that can be written in a time-of-flight record register or latch. The records from time-of-flight registers or latches can be read-out and passed to the histogram block for subsequent histogram generation and storage. Although, the timing circuit (e.g., the TDC 232) is illustrated by FIG. 2 as being separate from the optical-signal processing circuitry 225, in various embodiments, the timing circuit can form part of the optical-signal processing circuitry 225.

Note that in an alternative embodiment, the timing circuit may be integrated in-pixel, or shared across columns, rows or other sections via means of column/row decoding, multiplexing, etc. The timing circuit can operate in both forward and reverse modes. A forward mode can imply serving of a reference signal as a START signal, and a SPAD detection as an END signal, and vice versa in a reverse mode.

The digital signal processor (e.g., signal processing circuitry 236) can be responsible for execution of algorithms for signal detection (e.g., CFAR or "Constant False Alarm Rate" detection algorithms) and for writing detected signals to RAM. A final point cloud generated from distinct reflections can be retrieved from RAM. Processing by the digital signal processor may extend beyond signal detection including but not limited to: subsequent point-cloud filtering, segmentation, object classification, and state estimation.

A storage circuit, such as depicted in FIG. 1, can be configured to store respective counts of the photons that arrive in a plurality of different time bins within the operational region with the bin widths for different sub-regions being adapted by the histogramming circuitry 234 to refine the accuracy metric of one or more sub-histograms. While obtaining the measurements, the memory that is associated with the optical-signal processing circuitry 225 stores respective counts of the photons that arrive at the processing circuitry in multiple different time bins having different widths, which span the detection window that the transmitter driver 224 and timing engine 230 set for this optical-signal processing circuitry 225. A controller can process a histogram of the respective counts over the different bins for the sensing circuitry so as to derive and output a respective time-of-arrival value for the optical-signal processing circuitry 225.

As may be appreciated, embodiments are not to be limited to use of a TDC and can include apparatuses having an analog-to-digital converter (ADC). For example, the detected reflected optical radiation is provided to the ADC via a correlated double sampling (CDS) circuit that receives the detected signal from the optical-signal processing circuitry 225 and outputs a sampled signal whose voltage is proportional to the detected time-of-arrival of the photon to the ADC. For general and specific information related to estimating time-of-flight and specific information on use of TDCs or ADCs, reference is made to U.S. Pat. No. 9,502,458, titled "Circuit for generating direct timing histogram data in response to photon detection," filed Mar. 10, 2015 and U.S. Publication Ser. No. 14/830,760, titled "SPAD array with gated histogram construction," filed Aug. 20, 2015.

Figure 3A:
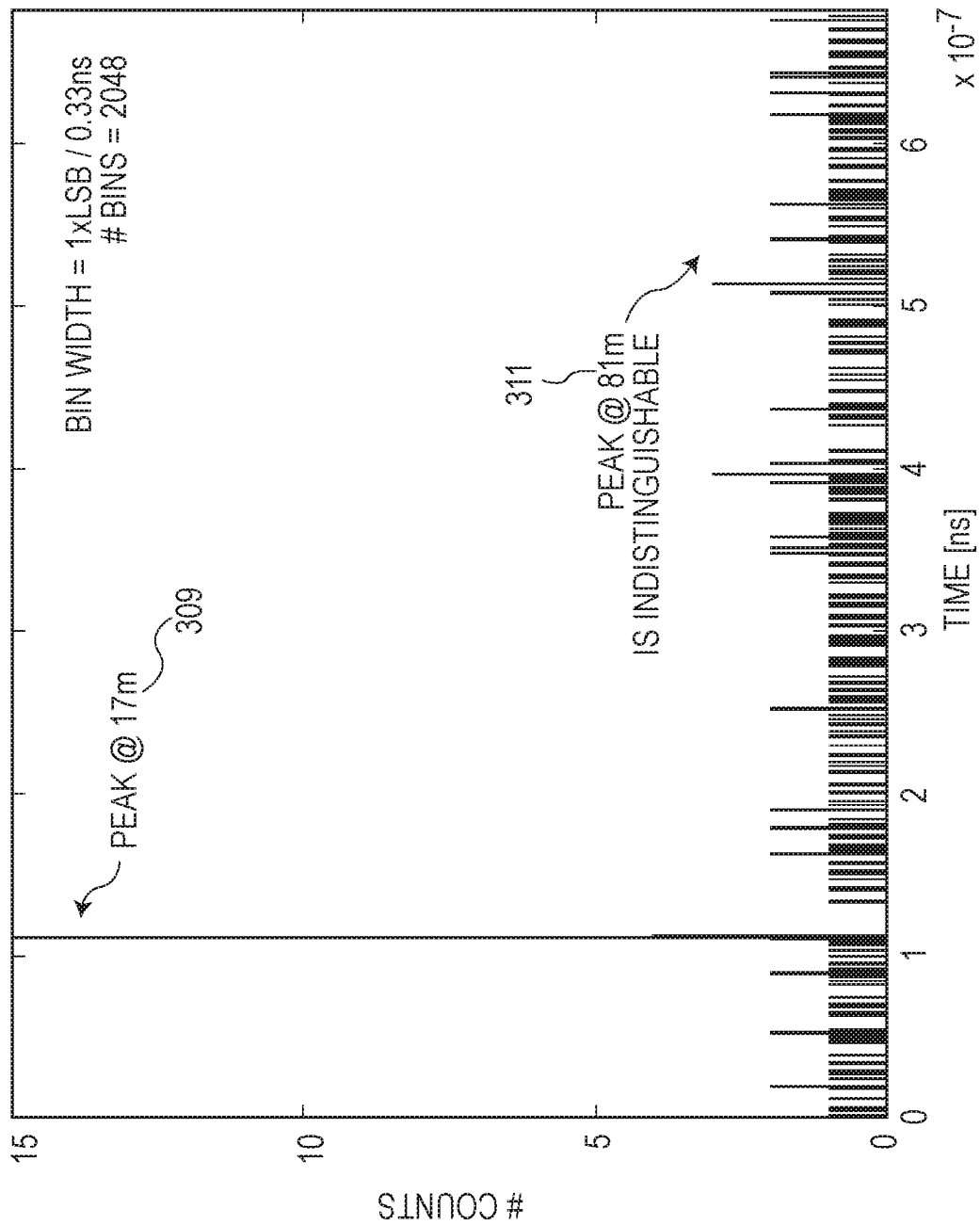
FIGS. 3A-3C illustrate examples of histogram bin widths, in accordance with the present disclosure.
Figure 3B:
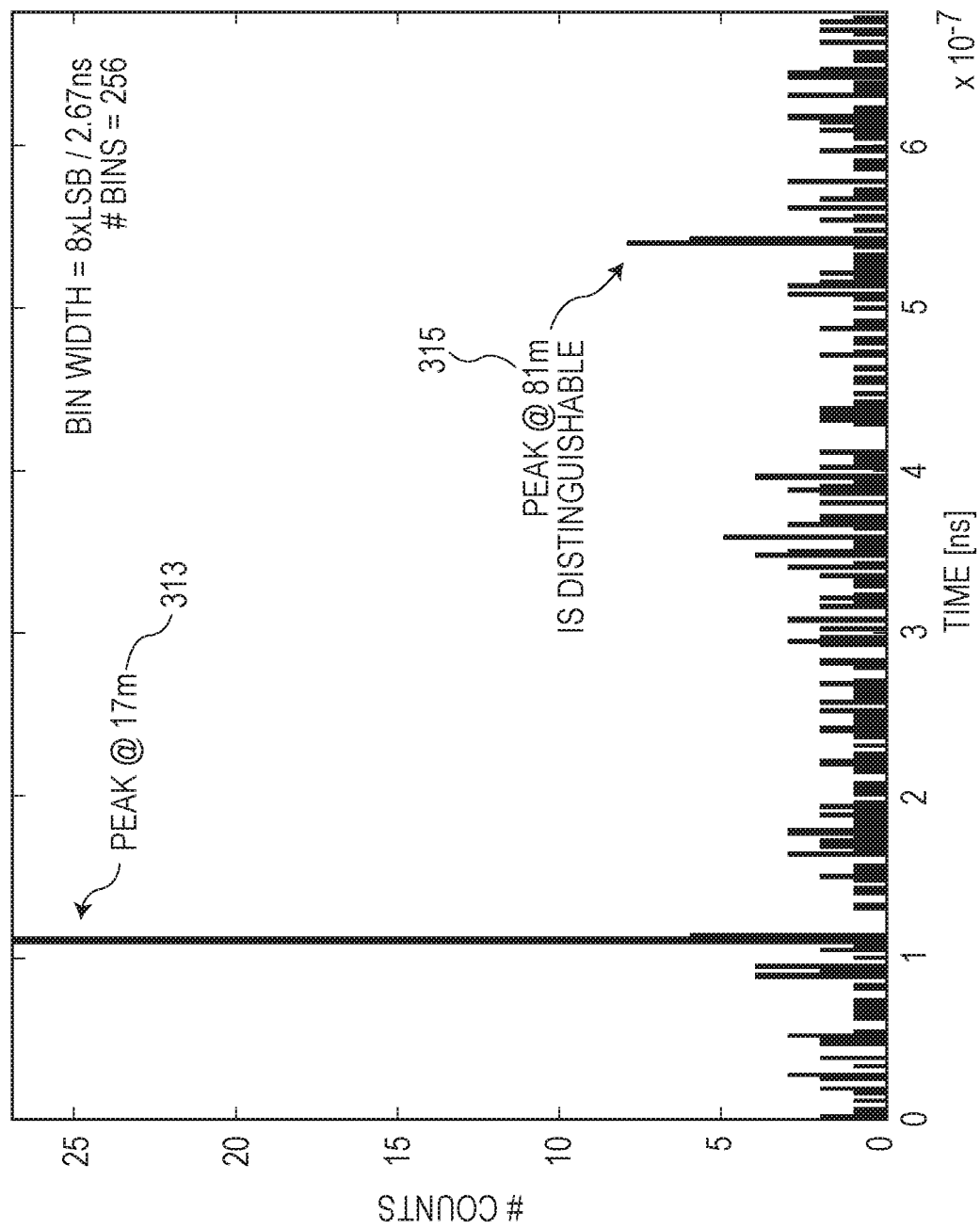
Figure 3C:
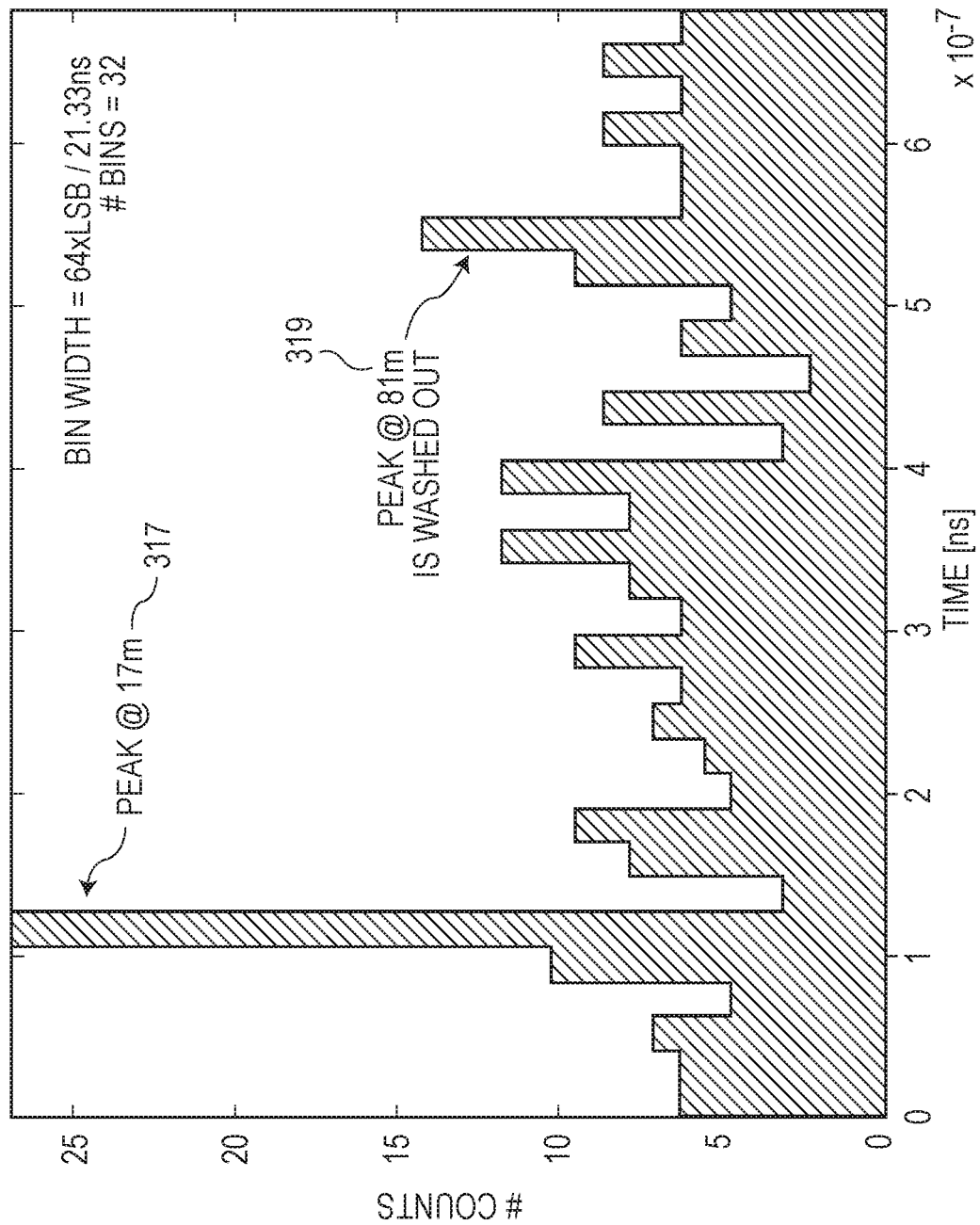

FIGS. 3A-3C illustrate examples of histogram bin widths, in accordance with the present disclosure. FIGS. 3A-3C illustrate three equi-width histograms with different bin widths for the same data, with each histogram representing the complete operational region. Assume a TDC resolution of 333 ps (e.g., LSB corresponds to 333 ps). As is illustrated by FIG. 3A, in a histogram with bin width of 1×LSB (e.g., bin width 1×LSB/0.33 ns and having 2048 bins), a strong signal from a physical object at 17 m has a distinct peak, as illustrated by 309, however a weaker signal from another physical object at 81 m is indistinguishable, as illustrated by 311. As illustrated by FIG. 3B, in a histogram with bin width of 8×LSB (e.g., bin width 8×LSB/2.67 ns and having 256 bins) both peaks at 17 m and at 81 m are distinguishable, as illustrated respectively by 313 and 315. A possible disadvantage (depending on the application and specific embodiment) of 8×LSB bin width is the loss of the range resolution, 40 cm against 5 cm. A 40 cm range resolution, depending on the use-case, may be sufficient for the other physical objects at 81m (e.g., as illustrated by 315) but not for the physical object at 17 m (e.g., as illustrated by 313). FIG. 3C, in which bin width is set to 64×LSB (e.g., bin width 64×LSB/21.33 ns and having 32 bins), demonstrates a different side effect at the other extreme: if bin width is set too wide, a weak signal is washed out with the noise, as illustrated by 319 (e.g., peak at 81 m) as compared to 317 (e.g., peak at 17 m).

The trade-off between resolution for strong signals and detection reliability for weak signals is signal power and the resulting respective cumulative photon distribution. Due to the blocking nature of SPAD array circuitry, e.g., earlier photons block later ones due to device quenching and subsequent dead-time, different signal shapes than expected may exist in the resulting histogram. A strong signal saturates the SPAD array circuitry almost instantaneously, while a weak signal requires a longer integration time for the SPAD array circuitry to become saturated.

Figure 4A:
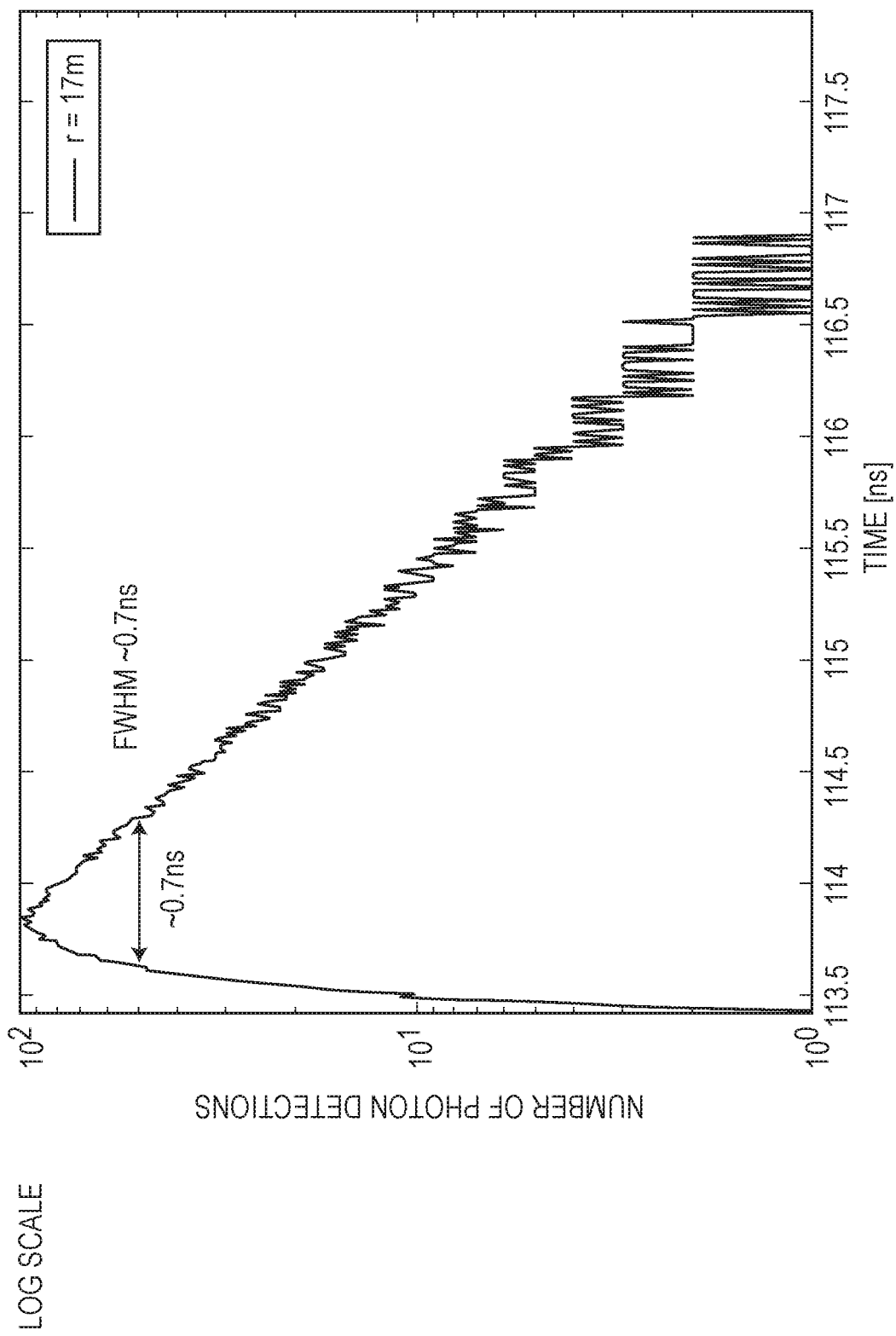
FIGS. 4A-4B illustrate example pulse shapes of signals, in accordance with the present disclosure.
Figure 4B:
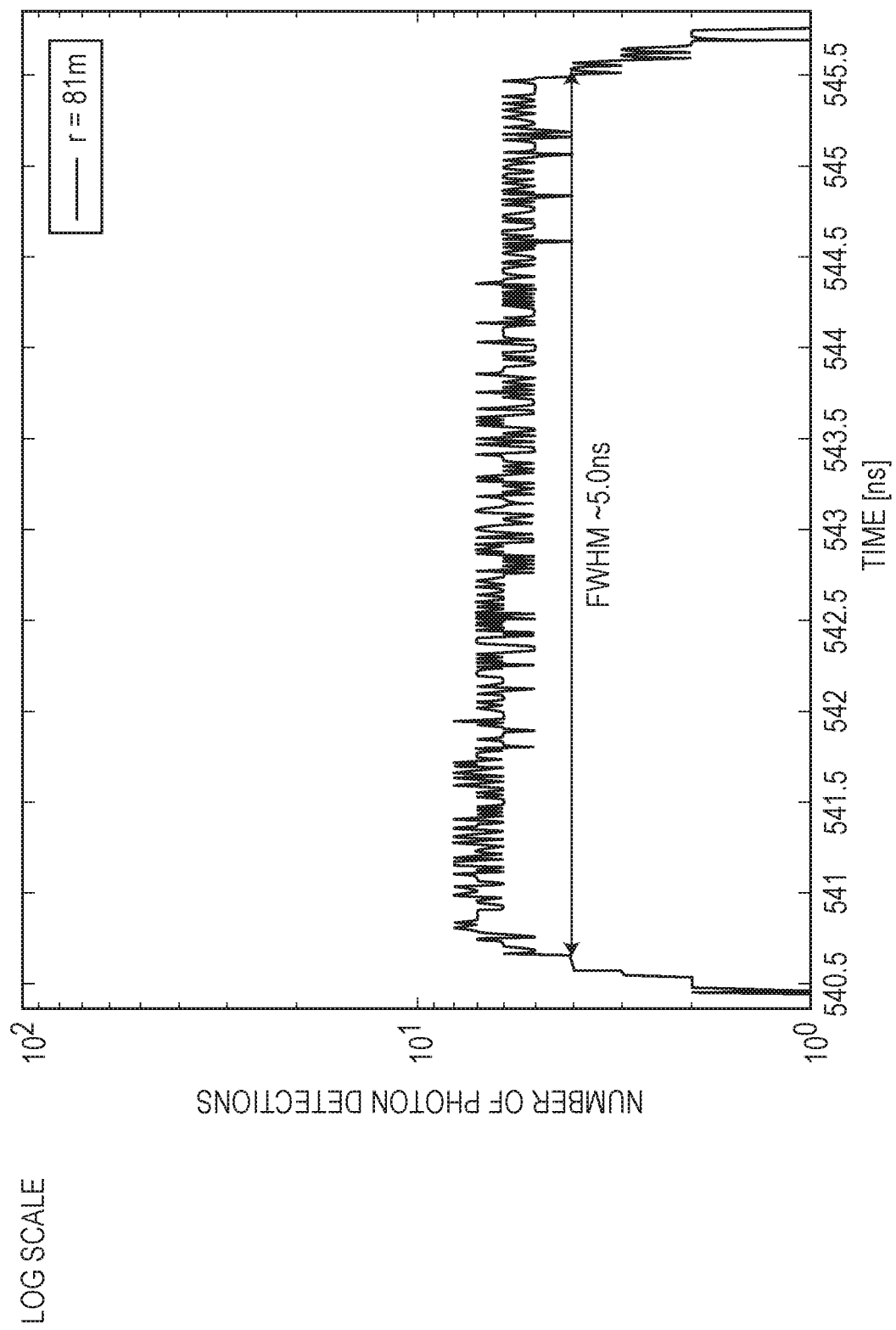

FIGS. 4A-4B illustrate example pulse shapes of signals, in accordance with the present disclosure. More specifically, FIGS. 4A and 4B illustrate a fine resolution (10 ps) histogram with a higher number of measurements for target reflections at 17 m and 81 m, respectively. The original signal is a square pulse with full-width at half maximum (FWHM) of 0.5 nanoseconds (ns) and rising and falling times of 0.5 ns. The FWHM of the target reflection at 17 m is around 0.7 ns and of 81 m is around 5.0 ns, e.g., the latter corresponds to the FWHM of original square pulse signal. In general, bin width of half of FWHM can be optimal as it ensures at least one bin is fully contained in the FWHM of the detected signal, e.g., maximizes that bin's SNR. As a result, optimal bin widths for respective physical objects also differ, with 0.35 ns or approximately 1×LSB (recall that in LSB is equal to 333 ps in the example described above) for the physical object at 17m, and 2.5 ns or approximately 8×LSB for the other physical object at 81 m.

FIG. 5 illustrates an example of a power-adaptive histogram, in accordance with various embodiments. As previously described, the complete operational region is divided into sub-regions each with its independent sub-histogram with a bin width adapted based on signal power. As bin widths are adjusted relative to signal strength with acquisition cycles, the technique mimics the quality of frequency based histograms for real-time applications, while preserving low maintenance of equi-width histogram. The specific histogram illustrated by FIG. 5 has four sub-histograms 501, 503, 505, 507 with bin width of 1, 1, 2, and 8 LSB respectively on the data from FIGS. 3A-3C. This way, sub-histogram 0 (e.g., identified as 501) contains 512 bins, sub-histogram 1 (e.g., identified as 503) contains 512 bins, sub-histogram 2 (e.g., identified as 505) contains 256 bins, and sub-histogram 3 (e.g., identified as 507) contains 64 bins. Although as may be appreciated, embodiments are not limited to histograms having four sub-histograms and can include more or less than four sub-histograms. In this example, the reflection from the physical object at 17 m (e.g., as illustrated by 509) belongs to the sub-histogram 0 with the bin width of 1×LSB and the reflection from the other physical object at 81 m (e.g., as illustrated by 511) belongs to the sub-histogram 3 with the bin width of 8×LSB.

In such an example, the reflected signal from physical object at 17 m is stronger than the one from other physical object at 81 m proportionally to the inverse-square of the range. It is worth noting, however, that signals from closer physical objects are not necessarily stronger than the ones from more distant physical objects. For example, an object with reflectivity of 0.8, or 80 percent, at the distance of 50 m can result in a stronger reflected signal at the receiver than the object with reflectivity of 0.1, or 10 percent, at the distance of 30 m. Therefore, a sub-region containing 50 m can have a smaller bin width than the sub-region containing 30 m range. Also, note that although for hard targets (as in the above-provided example), the FWHM of reflected signal is limited by FWHM of original transmitted signal, it may not be true for so-called soft targets such as water droplets or glass.

The above described and illustrated adaptive histogram is an example of power-adaptive histogram partitioning. However, embodiments are not so limited, and various partitioning of a complete operation region can be performed, based on what is optimal given the number of reflected signals, their strength, memory limitations, etc. The finer sub-regions (e.g., complete region is divided into higher number of sub-regions) can lead to better results, but may come with additional processing and memory costs. After each acquisition cycle (see FIG. 6A), e.g., when final histogram is completed, the histogram is analyzed and the optimal histogram settings for the next acquisition cycle are set, such as: number of sub-regions, boundaries of sub-regions, and bin-widths for each sub-region.

Figure 6A:
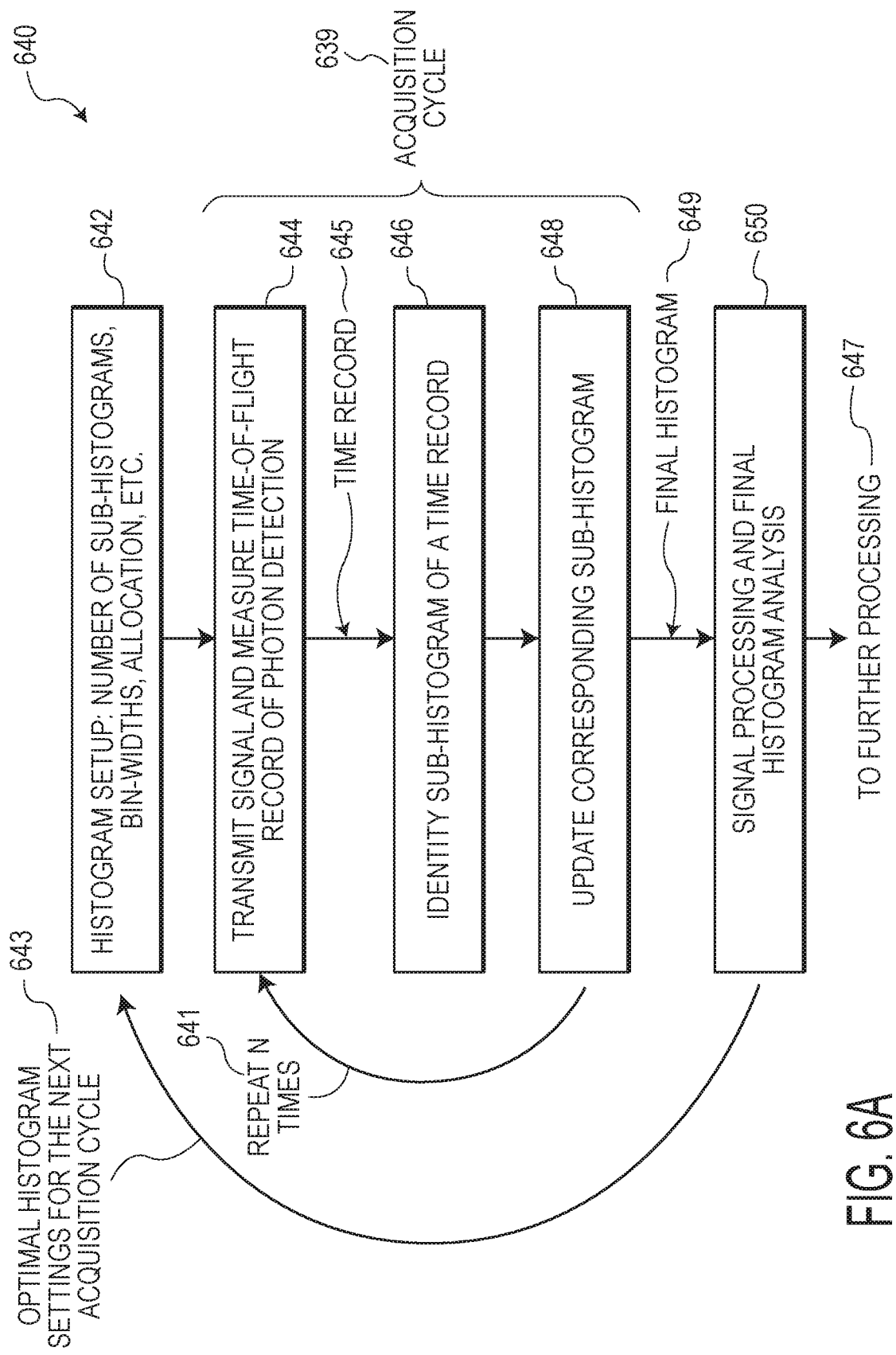
FIGS. 6A-6B illustrate example methods of using an apparatus, in accordance with the present disclosure.
Figure 6B:
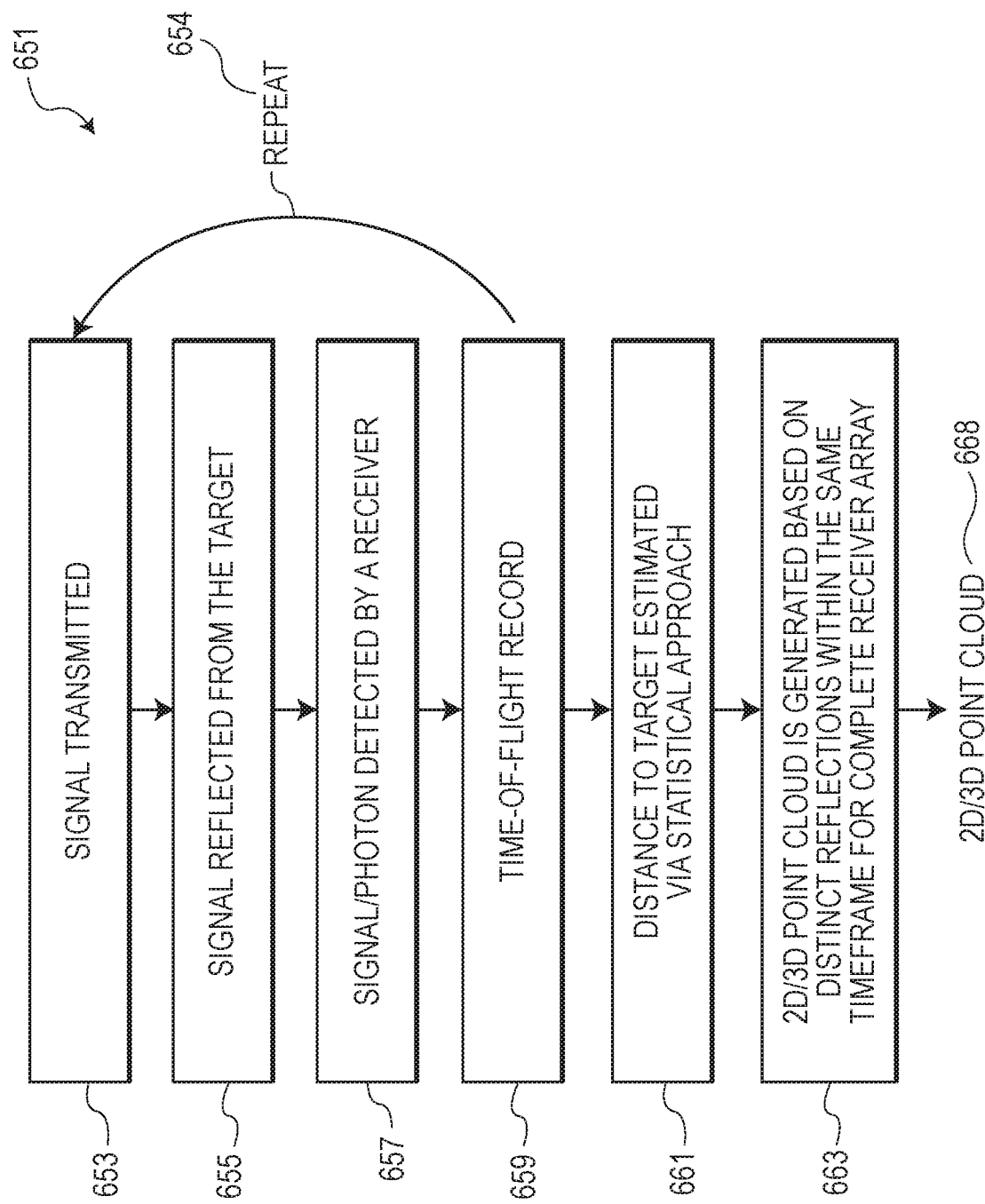

FIGS. 6A-6B illustrate example methods of using an apparatus, in accordance with the present disclosure. Such methods can be used to simultaneously detect more than one physical objects that are within an operational region, at different sub-regions of the operation region.

More specifically, FIG. 6A is an example of a process flow for power-adaptive histogram binning. The process 640 includes, at 642, for the first acquisition cycle (e.g., with an acquisition cycle illustrated by 639), the histogram is set up with default parameters: number of sub-histograms, bin widths; memory for sub-histograms is allocated and initialized with zeros. At 644, TX and RX front-end circuits transmit the signal and measure time-of-flight of the detection (either noise or return signal). At 646, the sub-histogram that the time-of-flight record 645 (hereinafter, time or data record) belongs to is identified and, at 648, the respective sub-histogram is updated by incrementing the corresponding bin. The measurements are repeated multiple times, at 641, and the final histogram 649 is complete, at 650. The histogram is processed, at 647, and analyzed for optimal histogram setting for the next acquisition cycle, at 643.

FIG. 6B illustrates an example of a signal flow process of a LIDAR system operated using the adaptive binning in accordance with various embodiments. As previously described, the process 651 can be used for sensing physical objects located in an operational region.

The process 651 includes, at 653, transmitting signals by the sensor circuitry (e.g., the TX front-end circuitry). More specifically, at 653, a laser light signal can be transmitted. Thereafter, as depicted at 655, the signal can be reflected from the target lying in the path of the transmitted laser light signal. Then, upon detection of the reflected light as indicated at 657, the time-of-flight can be recorded in a time-of-flight record, as illustrated at 659. Measurements can be repeated multiple times as indicated by the arrow 654 and a statistical approach can be used to identify the actual time-of-flight and as a result, the range to the target, as depicted at 661. That is, the distance to the target can be estimated via a statistical approach, as indicated at 661.

Combining distinct target reflections within a single time-frame from a complete receiver array, a step or operation can be implemented as shown thereafter at 663 in which a 2D/3D point cloud of the environment can be generated, at 668. Processing of a LIDAR system may extend beyond 2D/3D point cloud generation and can include further filtering of the point cloud (e.g., Kalman filter), segmentation, objects classification and state estimation, in various alternative embodiments.

Note that as utilized herein the term point cloud can relate to a set of data points in space. A point cloud can be used to measure a large number of points on surfaces and of objects around such surfaces. A point cloud can also relate to an organized point-cloud map obtained by indexing 3D data to LIDAR-specific 2D coordinate system or vice-versa.

The apparatuses and/or processes can be used to perform a variety of additional methods. An example method includes using sensor circuitry to sense and produce detected signals corresponding to physical objects located in the operational region relative to a location of the sensor circuitry. The method further includes using processing circuitry operating in response to the detected signals, to record and organize information associated with the detected signals in a plurality of sub-histograms respectively associated with different accuracy metrics for corresponding sub-regions of the operational region, each of the plurality of sub-histograms including a set of histogram bins characterized by a bin width linked to its accuracy metric, and to refine at least one of the accuracy metrics by adapting one or more of the bin widths dynamically in response to the detected signals. As previously described, adapting one or more of the bin widths can include dynamically adapting the bin width of at least one of sub-histograms in response to detected signals in one or more bins. Further, the information can be organized in two or more sub-histograms, wherein at least one of the two or more sub-histograms have a different bin width than the other of the two or more sub-histograms. In some embodiments, the information can be organized in three or more sub-histograms, such as four sub-histograms.

Figure 7:
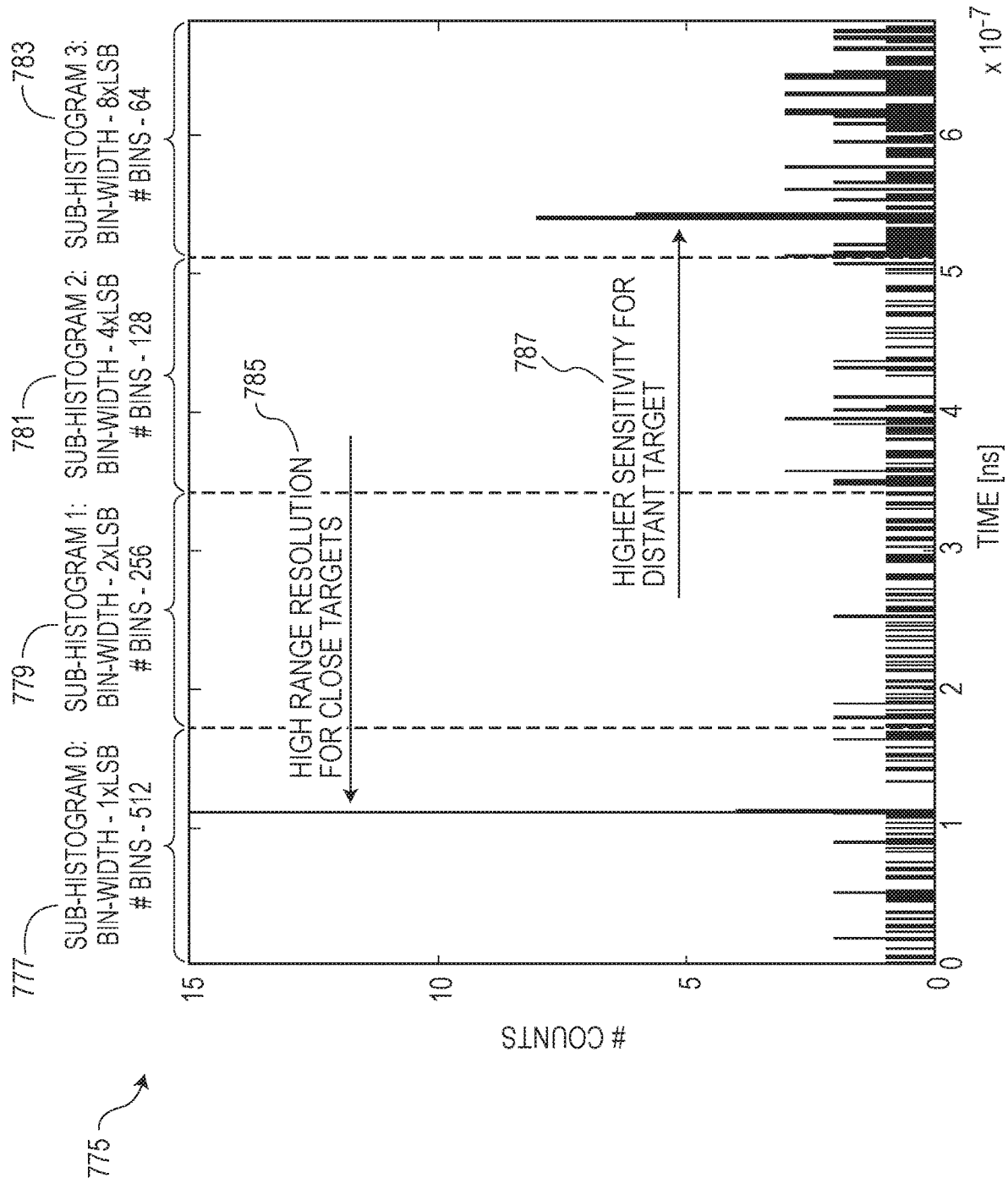
FIG. 7 illustrates a specific example of sub-histograms with adaptive binning, in accordance with various embodiments.

FIG. 7 illustrates a specific example of sub-histograms with adaptive binning, in accordance with various embodiments. More specifically, FIG. 7 illustrates an example range-adaptive histogram 775 on the data from FIGS. 3A-3B with the complete operational region divided into sub-regions each with its independent sub-histogram with bin width adapted to the range of the operational region. The specific histogram illustrated by FIG. 7 has four sub-histograms 777, 779, 781, 783 with bin widths of 1, 2, 4, and 8 LSB respectively. This way, sub-histogram 0 (e.g., identified as 777) contains 512 bins, sub-histogram 1 (e.g., identified as 779) contains 256 bins, sub-histogram 2 (e.g., identified as 781) contains 128 bins, and sub-histogram 3 (e.g., identified as 783) contains 64 bins. In this example, there is high range resolution for close targets as illustrated by 785 and higher sensitivity for distance targets as illustrated by 787. Such embodiments are directed to an efficient (fast and cheap) architecture that compensates for the range inverse square power drop, such as those further described herein and illustrated by FIGS. 8A-8B. The architecture can be used to efficiently partition the complete operational range into sub-histogram, adjust bin width or bin resolution of each sub-histogram, etc.

Figure 8A:
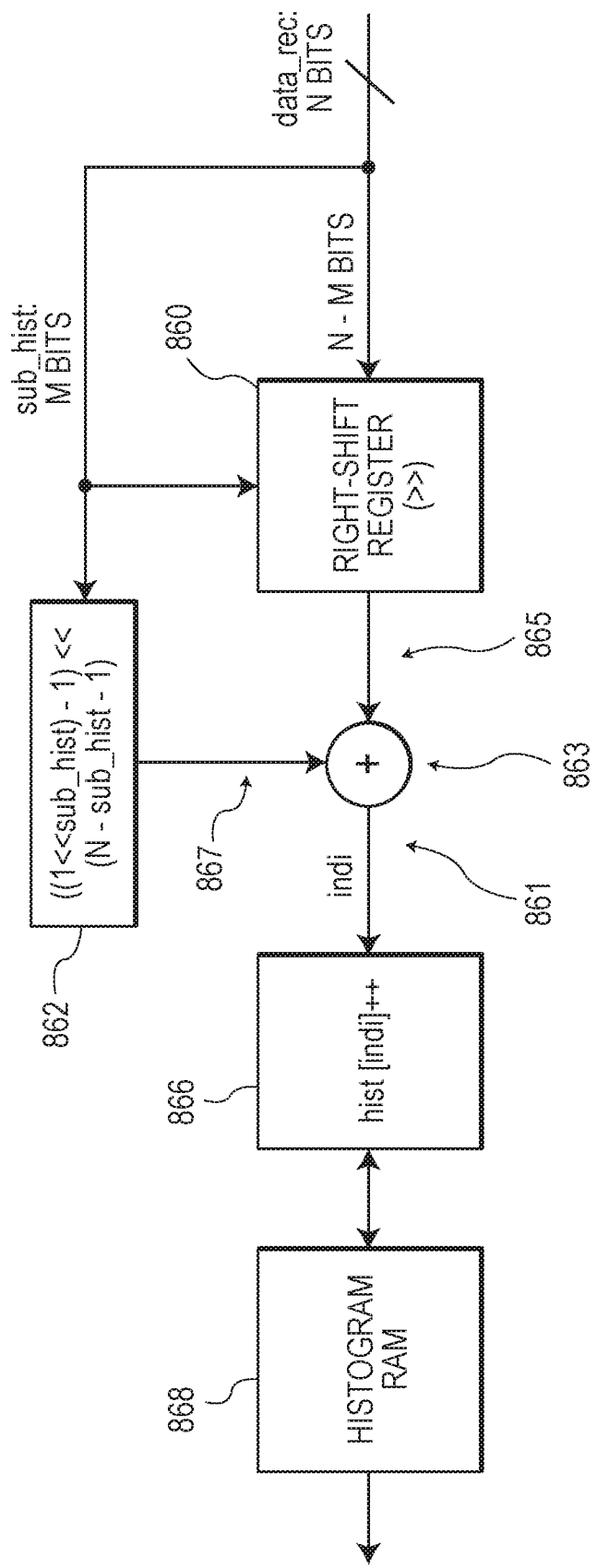
FIGS. 8A-8B illustrate examples data processing of sub-histograms with range-adaptive binning, in accordance with various embodiments.
Figure 8B:
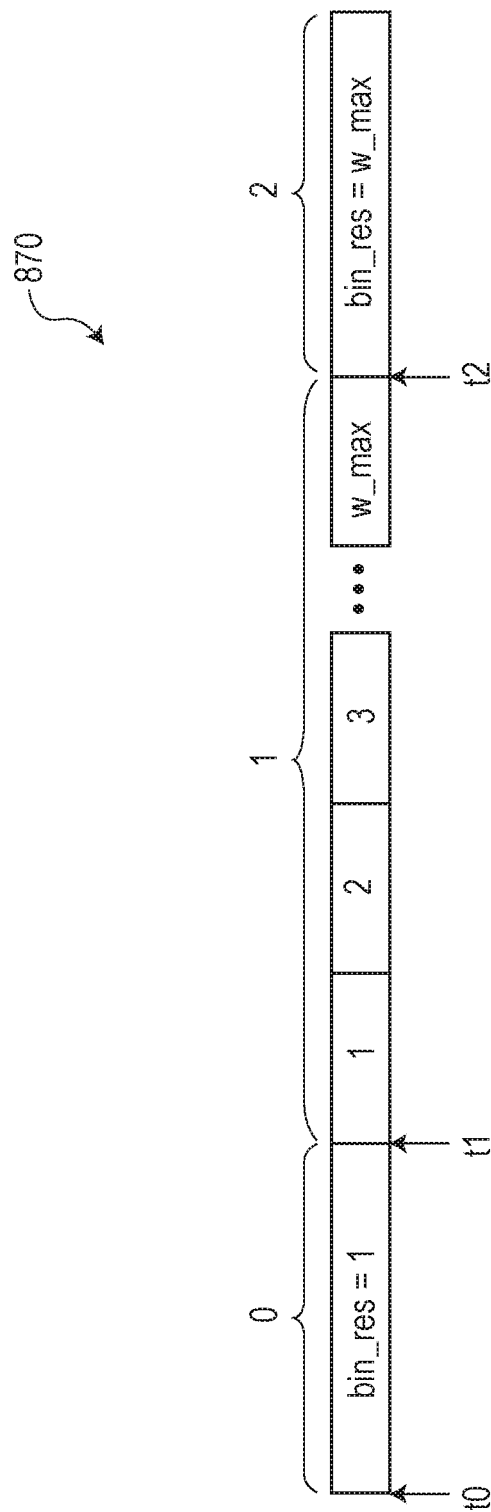

FIGS. 8A-8B illustrate examples of data processing of sub-histograms with range-adaptive binning, in accordance with various embodiments. As previously described, embodiments are not limited to adapting the bin widths based on power of the reflected signals detected. In various embodiments, in addition to adapting bin widths based on signal power, the bin widths can be adapted to compensate for the range inverse square drop, which is sometimes herein also referred to as a range-adaptive histogram or a range-adaptive application of a power-adaptive histogram binning technique that compensates for range inverse square power drop. Such range-adaptive applications can be computationally and memory-wise cheaper and compensates well for the range inverse-square power drop.

FIG. 8A illustrates an example range-adaptive histogram circuit, in accordance with various embodiments. The range-adaptive histogram circuit can include portions of the processing circuitry 102 illustrated by FIG. 1, in various embodiments. In the example, bins of all sub-histograms are written in a one single array, e.g. located in a memory. Therefore, hereinafter, the term local bin index, refers to or includes a time record's bin index inside a corresponding sub-histogram's part of the array, and the term global bin index, refers to or includes a time record's bin index inside the complete array. The range-adaptive histogram circuit includes a block to perform an operation of retrieving corresponding sub-histogram's first bins global index 867, shift register 860, a storage circuit (e.g., histogram RAM 868), adder 863, among other circuit components such as those illustrated by FIG. 8A (e.g., hist. [indi]++ 866).

As a histogram construction is a non-vectorizable task and cannot be efficiently handled by a digital signal processor, it can be beneficial to have a technique provided with a fast, and simultaneously, inexpensive approach that enables real-time histogram construction in parallel to data acquisition, e.g., histogram is updated immediately as soon as the new time record has arrived. With such embodiments, several advantages can be gained. First, since data acquisition and histogram construction are done in parallel, the overall cycle time can be reduced. Additionally, such embodiments can include lower memory requirements, as the histogram is a compressed representation of the data, whereas individual records are not stored. The range-adaptive embodiments can be achieved by several considerations, including how the complete operational region is sub-divided, and how bin widths are chosen. In particular, the operational region is divided in such a way that only the first M most significant bits (MSBs) of any data record determine the corresponding sub-histogram and the remaining (N−M) bits determine the corresponding bin index inside that sub-histogram, where N is the total number of bits. There may be no overlap between bits determining the sub-histogram and the corresponding local bin index. Another simplification is the bin-width to be in the form of $2^w \times LSB$. This way, the time record's local bin index 865 is simply retrieved via right shift of last (N−M) bits by w (hereinafter w is called bin resolution) via the right-shift register 860. This limits the number of possible bin widths, and drastically lowers computational costs. Block 862 uses M MSBs to retrieve corresponding sub-histogram's first bin's global index 867 inside complete array. Via adder 863, time records' local bin index 865 and corresponding sub-histogram's first bin global index 867 are used to determine time records' global bin index 861. Corresponding bin is then updated in histogram memory 868.

The circuitry illustrated by FIG. 8A can have various conditions. First, if the histogram is divided into a large number of sub-histograms, the bin width becomes too wide very quickly (exponential growth) and the signal is washed up by the noise (see FIG. 3C). As previously described, a bin width that is half of detected signal's FWHM can ensure that at least one bin is fully contained in the FWHM, which can maximize SNR of that bin. For hard physical objects (opposite to soft such as water droplets, glass, etc.), the FWHM of detected signal does not exceed that of the transmitted signal. Since transmitted signal's FWHM is a known parameter, the maximum bin width can be limited by half of that amount. Another condition is somewhat opposite of the first: even for further physical objects (e.g., belonging to sub-histogram >=1), the signal may be strong enough for optimal bin width of 1×LSB. To resolve this, the complete histogram is divided into three so-called pages as illustrated by FIG. 8B.

As illustrated by FIG. 8B with the histogram being divided into pages as depicted at 870, where bin_res represents bin resolution, and w_max is calculated as the closest optimal resolution for the FWHM of transmitted signal. By controlling t1 and t2 and with an additional conditional check(s), additional versatility to range-adaptive histogram can be achieved. After each acquisition, the histogram can be analyzed for optimal change to histogram settings such as: t1, t2, number of sub-histograms in range-adaptive page, etc.

In addition, system parameters such as TDC resolution and/or a transmitted signal FWHM can be set in design phase such as to further optimize range-adaptive histogram binning technique. For example, by ensuring that:

$$FWHM_{TX} = 2^w * \Delta t_{TDC}/2,$$

where w is a maximum number of sub-histograms in range-adaptive region. This helps to ensure that the coarsest bin resolution w is optimal for the weakest/furthest possible signals.

Embodiments as described above are directed to generating adaptive histograms having sub-histograms with adaptive bin widths. Bin-widths of the sub-histograms are selected to maximize SNR of detected signals for reliable subsequent peak detection processing, e.g., constant false alarm rate (CFAR). CFAR power of each bin is compared to the local noise power that exclude guard bins surrounding the bin of interest. The adaptive histogram technique in accordance with various embodiments, provides a trade-off in a more efficient and computationally cheap manner than potential adaptations in peak detection processing on an equi-width histogram. By optimizing bin-width of the sub-histogram to the half of detected signal width, a maximum SNR is ensured, as at least one bin will be fully contained in the FWHM of the signal. An equi-width histogram can manifest a possible disadvantage if the guard region is narrow in comparison to detected signal width (e.g., guard bin number is low and/or bin width is narrow), in which case a portion of the signal is included in local noise estimate and this consequently reduces the rate of signal detection. Also, if one selects a wider local noise region to reduce an impact of the detected signal, which can result in delayed and limited response to a local noise change. Further, if guard region is wide in comparison to detected signal width, then range resolution and/or accuracy is coarser than otherwise physically resolvable; and if a more advanced integration basis is used, (multiplication factor of 1 for current bin, 0.5 for the guard bins right next to it, 0.35 for further, and so on, when estimating current bin power), that can result in higher computing power requirements. Accordingly, aspects disclosed herein account for each of these factors or conditions and provide balance on the trade-off between resolution for strong signals and detection reliability for weak signals.

Furthermore, a power-adaptive histogram can be constructed both in parallel to data acquisition, as well as reconstructed from the equi-width histogram with the narrowest possible bin width (1×LSB). In the latter case, an additional process of reconstructing the histogram, with complexity O(N), is added to the processing pipeline. In addition, the latter may use higher memory capacities to store an original histogram. As an example related to the discussion above and relating to FIG. 7, in case of 16 bits per bin, the power-adaptive histogram can use 15,360 bits (per single SPAD pixel), while equi-width histogram with the bin width of 1×LSB can use 32.768 bit. More than double memory savings is achieved when power-adaptive histogram is constructed in parallel to data acquisition.

For a range-adaptive histogram in an application of power-adaptive histogram binning technique, advantages can be realized in connection with certain embodiments. By ensuring that bin widths are of the form $(2^w) \times LSB$, where w is called bin resolution, bin index can be retrieved via simple shift operation (w cycles). Sub-histograms are predefined to compensate for range inverse-square power drop.

Similarly, to bin index, the sub-histogram of the data record, as well as the pointer to the first bin in the memory, is retrieved via set of simple arithmetic operations on M most significant bits. In certain of these embodiments, versatility to range-adaptive histogram is added via introduction of pages, where page 0 corresponds to equi-width histogram of bin resolution 0, page 1 is range-adaptive page and page 2 corresponds to equi-width histogram of max bin resolution, for the low price of additional subtraction operation.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for in connection with the claimed disclosure by way of various circuits or circuitry which may be illustrated as or using terms such as blocks, modules, device, system, unit, controller, and/or other circuit-type depictions (e.g., reference numerals 106 and 234 of FIGS. 1-2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for carrying out these operations/activities, as may be carried out in the approaches shown in FIGS. 2 and 8A-8B. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described at FIGS. 6A-6B is used by the programmable circuit to perform the related steps, functions, operations, activities, etc. Depending on the application, the instructions (and/or configuration data) can be implemented using logic circuitry, with the instructions (whether characterized in the form of object code, firmware, or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the process illustrated by FIG. 6A can be used in combination with the process illustrated by FIG. 6B. As another example, circuit components illustrated by FIG. 2 can be used in various combinations with circuit components illustrated by FIG. 8A. Such modifications do not depart from the true spirit and scope of various aspects of the disclosure, including aspects set forth in the claims.

What is claimed is:

1. An apparatus comprising:
sensor circuitry configured and arranged to produce and sense detected signals corresponding to physical objects located in an operational region relative to a location of the sensor circuitry; and
processing circuitry configured and arranged to
record and organize information associated with the detected signals in a plurality of sub-histograms respectively associated with different accuracy metrics for corresponding sub-regions of the operational region, each of the plurality of sub-histograms including a set of histogram bins characterized by a bin width linked to its accuracy metric; and
refine at least one of the different accuracy metrics by adapting one or more of the bin widths dynamically in response to the detected signals.

2. The apparatus of claim 1, wherein the at least one accuracy metric is indicative of a detection reliability, and wherein the sensor circuitry is configured and arranged to measure time-of-flight by sensing optical signals and the processing circuitry is configured and arranged to simultaneously determine a distance of two or more physical objects from the sensor circuitry using the plurality of sub-histograms with the adapted one or more of the bin widths.

3. The apparatus of claim 1, wherein the at least one accuracy metric is indicative of a level of resolution, and wherein the plurality of sub-histograms includes at least two sub-histograms corresponding to two different sub-regions of the operational region.

4. The apparatus of claim 1, further including an automobile to which the sensor circuitry and the processing circuitry are secured, and wherein during movement of the automobile, the sensor circuitry is further configured and arranged to produce the detected signals dynamically and in response the processing circuitry is further configured and arranged to refine the at least one accuracy metric for at least one of the plurality of sub-histograms dynamically by adapting its bin width.

5. The apparatus of claim 1, wherein the plurality of sub-histograms correspond to different sub-regions of the operational region with each of the different sub-regions at least temporarily covering a different range indicated by a distance between the sensor circuitry and one or more of the physical objects.

6. The apparatus of claim 1, wherein the processing circuitry is further configured and arranged to refine the at least one accuracy metric in response to the detected signals indicating presence of a proximate one of the physical objects and of a distal one of the physical objects by:
adjusting a first bin width for a first one of the plurality of sub-histograms for optimizing or improving resolution associated with the proximate one of the physical objects; and
adjusting a second bin width corresponding to a second one of the plurality of sub-histograms for optimizing or improving detection reliability associated with the distal one of the physical objects.

7. The apparatus of claim 1, wherein the processing circuitry is further configured and arranged to refine the at least one accuracy metric as a function of at least one of an indication of power sensed in optically received signals, and an indication of distance between the sensor circuitry and one or more of the physical objects.

8. The apparatus of claim 1, wherein the processing circuitry is further configured and arranged to refine the at least one accuracy metric as a function of at least one of an indication of power or distance sensed in optically received signals by changing one of the bin widths of one of the plurality of different sub-histograms for a coarser detection to optimize or improve detection reliability of one or more distal ones of the physical objects, and by changing another one of the bin widths of another of the plurality of sub-histograms for a finer detection to optimize or improve resolution in terms of detecting one or more proximal ones of the physical objects.

9. The apparatus of claim 1, wherein the processing circuitry is further configured and arranged to facilitate detection reliability according to signal-to-noise ratio (SNR) of the detected signals, in order to process peak detection of the detected signals, wherein at least one of the bin widths is adjusted as an iterative step to improve the peak detection.

10. The apparatus of claim 1, wherein the processing circuitry is further configured and arranged to provide indications of power for the detected signals in each set of histogram bins, and to refine the at least one accuracy metric by adjusting the bin width based on empirical data indicating correspondence between bin widths and detected-signal power.

11. The apparatus of claim 1, wherein the processing circuitry is further configured and arranged to generate, at least temporarily, the plurality of sub-histograms, as a function of empirical data indicating correspondence between bin widths and detected-signal power, the empirical data being provided from a storage circuit integrated with the processing circuitry.

12. The apparatus of claim 1, wherein the processing circuitry is further configured and arranged to generate, at least temporarily, the sets of histogram bins, as a function of empirical data indicating correspondence between bin widths and detected-signal power, the empirical data being received from a communications channel provided from an external circuit.

13. The apparatus of claim 1, wherein the sensor circuitry and the processing circuitry are configured and arranged to operate concurrently in real-time, with the sensor circuitry producing the detected signals while the processing circuitry is constructing information for the plurality of sub-histograms.

14. The apparatus of claim 1, wherein the sensor circuitry is further configured and arranged to operate in an autonomous, or semi-autonomous, driving mode with the detected signals being produced dynamically and with the bins of the plurality of sub-histograms having information changing dynamically.

15. The apparatus of claim 1, wherein the sensor circuitry includes single-photon avalanche photodiode (SPAD) array circuitry, and is further configured and arranged to sense optical signals via the SPAD array circuitry and, in response, to produce the detected signals.

16. The apparatus of claim 1, wherein each of the plurality of sub-histograms includes two or more, and each of the two or more sub-histograms have a different bin width than the other sub-histograms, and wherein at least one of the different bin widths is adapted dynamically in response to the detected signals.

17. The apparatus of claim 1, each of the set of histogram bins has a bin width that is less than half of a transmitted light pulse width.

18. A method for sensing physical objects located in an operational region, the method comprising:
using sensor circuitry to sense and produce detected signals corresponding to physical objects located in the operational region relative to a location of the sensor circuitry; and
using processing circuitry operating in response to the detected signals to
record and organize information associated with the detected signals in a plurality of sub-histograms respectively associated with different accuracy metrics for corresponding sub-regions of the operational region, each of the plurality of sub-histograms including a set of histogram bins characterized by a bin width linked to its accuracy metric; and
refine at least one of the different accuracy metrics by adapting one or more of the bin widths dynamically in response to the detected signals.

19. The method of claim 18, wherein adapting one or more of the bin widths includes dynamically adapting the bin width of at least one of the plurality of sub-histograms in response to detected signals in one or more bins.

20. The method of claim 18, further including organizing the information in two or more sub-histograms, wherein at least one of the two or more sub-histograms have a different bin width than the other of the two or more sub-histograms.

* * * * *